April 17, 1951 J. S. KEMP 2,548,981

MAGNETIC RECORDER AND WIRE HANDLING MEANS THEREFOR

Filed Feb. 20, 1946 2 Sheets-Sheet 1

Inventor

JAY STERLING KEMP by The Firm of Charles W. Hills Attys

Inventor
JAY STERLING KEMP
by The Firm of Charles W. Hills
Attys

Patented Apr. 17, 1951

2,548,981

UNITED STATES PATENT OFFICE 2,548,981

MAGNETIC RECORDER AND WIRE HANDLING MEANS THEREFOR

Jay Sterling Kemp, Chicago, Ill., assignor to Armour Research Foundation of Illinois Institute of Technology, Chicago, Ill., a corporation of Illinois Application February 20, 1946, Serial No. 648,992

2 Claims. (Cl. 274—4)

This invention relates to a magnetic recorder and wire handling means therefor, and more particularly to a magnetic recorder employing an elongated magnetizable record medium in endless new form.

Magnetic recorders of the prior art, and particularly those employing wire or other thread-like media, have usually handled the wire in one of two principal manners. One of these manners for handling wire is to employ a pair of spools and unwind the wire from one spool and wind it onto the other spool. This type of construction, of course, necessitated rewinding the wire onto the first spool before the recording could be played over again. The second principal manner of handling the wire in magnetic recording devices was to have an endless loop in which, after the record had been played completely through, the record was immediately ready for reuse, and indeed, could be played over and over again. While many attempts have been made to provide satisfactory wire handling means for the endless loop type of magnetic recording devices, great difficulty has been experienced in the past in handling the wire in a satisfactory manner, in maintaining proper tension in the wire at all times, and in preventing the wire from becoming snarled or entangled.

One of the principal features and objects of the present invention is to provide a novel wire handling means which is particularly suitable for magnetic recording and reproducing devices. As hereinafter used in the specification and claims, the term "magnetic recorder" will be used to designate a device which is either a magnetic recording device, a magnetic reproducing device, or both a magnetic recording and a magnetic reproducing device.

It is a further object of the present invention to provide a novel magnetic recorder which employs an elongated record member of the endless loop type.

A still further object of the present invention is to provide a novel magnetic recorder of the endless loop type in which means is provided for automatically stopping the device when one complete loop has passed through the recording and/or reproducing head.

A still further object of the present invention is to provide a novel wire handling means and automatic stop mechanism therefor.

The novel features which I believe to be characteristic of my invention are set forth with particularity in the appended claims. My invention itself, however, both as to its manner of construction and method of operation, together with further objects and advantages thereof, may best be understood by reference to the following description, taken in connection with the accompanying drawings, in which:

Figure 1:
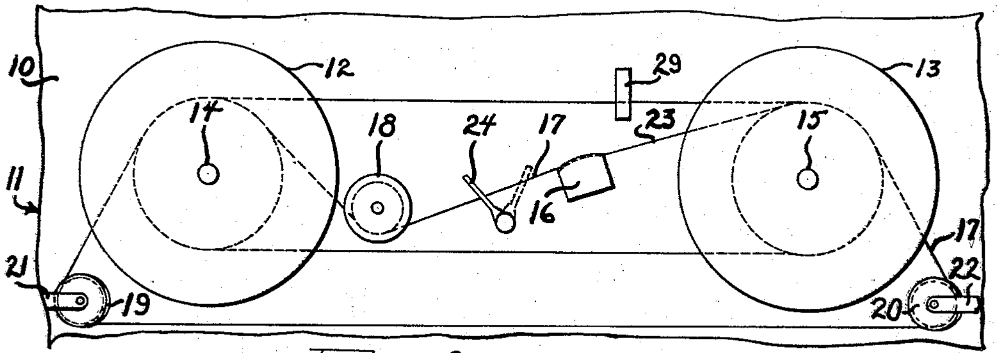
Figure 1 is a fragmentary front elevational view of the panel of a magnetic recorder having wire handling means and automatic stop mechanism thereon embodying the novel teachings and principles of the present invention.
Figure 2:
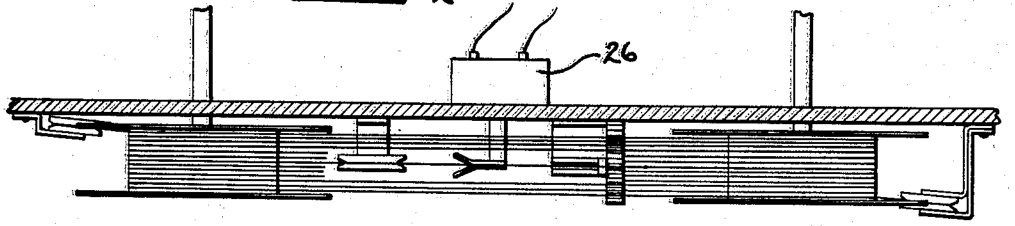
Figure 2 is a top view of the portion of the magnetic recorder shown in Figure 1 of the drawings.
Figure 3:
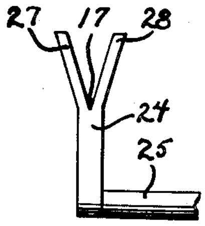
Figure 3 is an enlarged side view of the trip finger of the automatic stop mechanism which is mounted on the front panel of the magnetic recorder shown in Figures 1 and 2.

Referring now to the embodiment of the invention which is illustrated in Figures 1 to 3 of of the drawings, there is shown therein the front panel 10 of a magnetic recording and reproducing device generally designated by the reference numeral 11. On this front panel 10 is mounted a pair of spools 12 and 13. The spools or drums 12 and 13 are secured to drive shafts 14 and 15, which are both arranged to rotate in the same direction.

By way of illustration the description of the device will be made with the spools 12 and 13 rotating in a clockwise direction.

A magnetic transducer head 16 is mounted on the front of the panel 10 and is arranged to have the endless loop of the wire 17 pass therethrough. The elongated record member 17, as indicated, may be conveniently in the form of a magnetizable wire having a sufficiently high coercive force to retain a magnetic record thereon.

A guide or idler pulley 18 is also mounted on the front of the panel 10 and is arranged to have the wire 17 pass thereover before reaching the head 16. In addition to the idler pulley 18, two additional idler pulleys 19 and 20 are provided at the two lower corners of the panel 11 and are carried in brackets 21 and 22 respectively. While these brackets 21 and 22 are shown as being mounted in a fixed position in Figures 1 and 2 of the drawing, it is to be understood that they may be biased in the manner hereinafter to be described in connection with one other embodiment of the invention.

The wire 17, as hereinbefore indicated, is in the form of an endless loop, the loop being joined by a knot or weld which forms a slight bulge in the wire, as indicated at 23.

The manner in which the wire 17 is wound around the spools 12 and 13 and over the guide pulleys 18, 19 and 20, can easily be traced by starting with the knot 23. From this point the wire passes over the spool 13 and then over the spool 12 and back over the spool 13 until this has been repeated a number of times. As indicated in Figure 2 of the drawings, six complete turns in this fashion are shown following the knot. The wire 17 thereafter passes down over the guide pulley 20 then diagonally across beneath the two spools 13 and 12, thence around guide pulley 19 and finally up over spool 12. From this point it continues to make a number of turns around the two spools 13 and 12 until a position is reached substantially opposite the center of the spool 12. It then passes down under guide pulley 18 and finally through recorder head 16. It is then ready to start its complete cycle over again.

Interposed between the guide pulley 18 and the head 16 is a trip finger 24 which may be seen best in Figure 3. The trip finger 24 is mounted for limited angular movement about a shaft 25 which extends through the panel 10 from switch mechanism 26 in the motor circuit of the magnetic recorder. The trip finger 24 has a bifurcated upper end formed by a pair of diverging fingers 27 and 28 between which the wire 17 is arranged to pass. The finger 24, in the operating position of the recorder, is in the position as shown by the full lines of Figure 1 of the drawings.

When the knot 23 in the wire 17 strikes the fingers 27 and 28 the trip arm 24 is rocked to the dotted line position as shown in Figure 1 of the drawing and in this position the knot is able to ride up the fingers 27 and 28 until it reaches a point where the spacing between the two fingers is sufficiently wide for the knot to pass therethrough. It will be understood that when the trip arm 24 is in the position as shown by the dotted lines in Figure 1, the switch 26 is open and the motor circuit deenergized. In order to start the mechanism again it is necessary to reset the trip finger 24 to its position as shown in the full lines in Figure 1.

In order to keep the successive strands of wire properly spaced as they pass over the drums 12 and 13, a wire spacer bar 29 is mounted on the front of the panel 10 which has a comb-shaped upper edge. The teeth forming the comb-shaped upper edge of the bar 29 are arranged so that only one strand of wire passes between each adjacent pair of teeth. This may be seen in Figure 2 of the drawings. In connection with the bar 29, it may be said that the teeth are spaced sufficiently far apart so that the knot 23 will pass therebetween.

Figure 4:
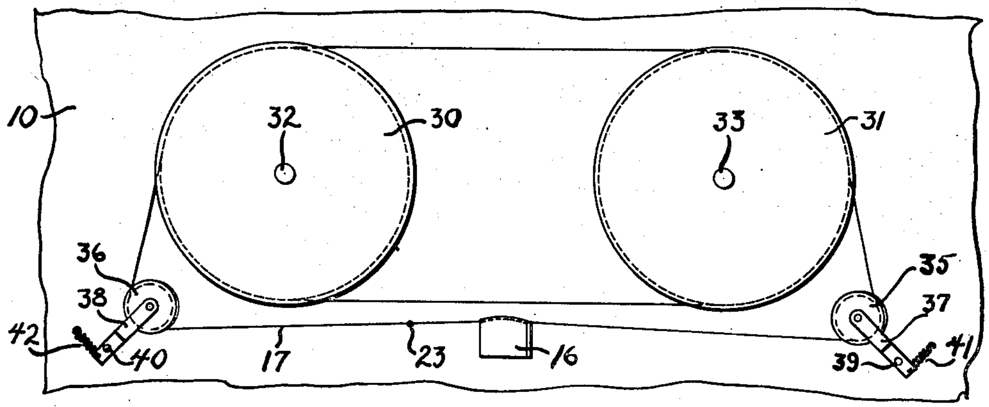
Figure 4 is a fragmentary front elevational view of the front panel of a magnetic recorder which is provided with a modified form of the present invention.
Figure 6:
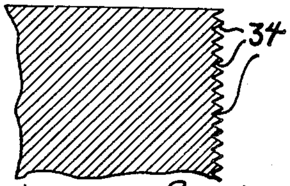
Figure 6 is a greatly enlarged fragmentary sectional view of one of the drums over which the wire is passed.
Figure 5:
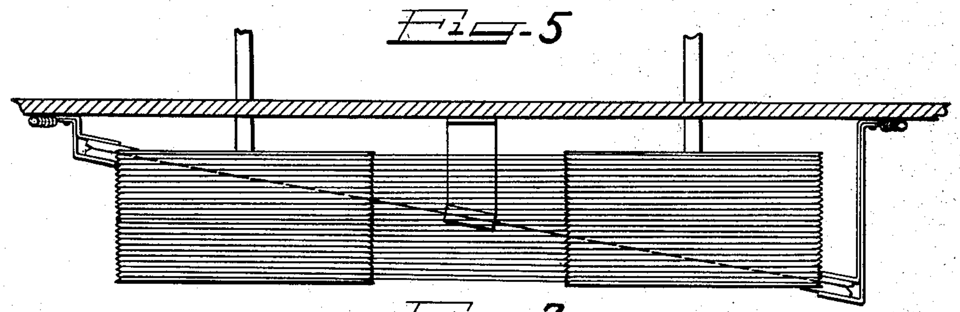
Figure 5 is a top plan view of the portion of the magnetic recorder which is shown in Figure 4.

The second embodiment of the present invention is illustrated in Figures 4, 5 and 6 of the drawings. In this form of the invention a pair of drums 30 and 31 are secured on shafts 32 and 33 respectively carried on the panel 10 of the magnetic recorder. The drums 30 and 31 have a large number of annular grooves 34 disposed in spaced parallel planes at right angles to the axis of rotation of the drums. These annular grooves 34 may be seen best in Figures 5 and 6 of the drawings. It has been found to be extremely important that these grooves be disposed in spaced parallel planes rather than in the form of a helix, for with the latter form of construction the wire has been found to stall and easily become entangled.

In this form of the invention the wire 17, after it reaches the front end of drum 31, passes down over a guide pulley 35 and thence through the recorder head 16 as it extends diagonally beneath the drums 30 and 31, and then along guide pulley 36 and back to drum 30. In reaching drum 30 from idler pulley 36 the wire passes over the first groove in drum 30 and then over the first groove in drum 31. It then passes back and into the second groove from the back in drum 30, then across the top to the second groove from the back in groove 31, etc. until it reaches the front groove in drum 30 where it passes down and around the guide pulley 35. It will be observed that the recorder head, in this instance, is located in the diagonal reach of the wire 17 as it passes between the two guide pulleys 35 and 36.

It will further be observed that the guide pulleys 35 and 36 are mounted in brackets 37 and 38 which are pivotally mounted as at 39 and 40 and spring biased to tension the wire 17 by springs 41 and 42.

In connection with the second embodiment of the invention it will also be observed that no comb is necessary since the drums, with their annular grooves disposed in spaced parallel planes transverse to the axis of rotation of the drums, is sufficient to keep the successive strands of wire properly spaced.

Figure 7:
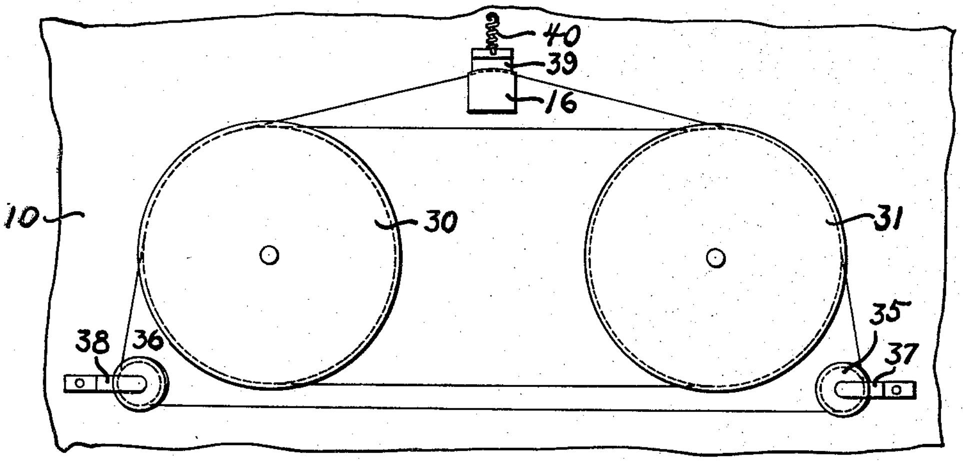
Figure 7 is a view similar to Figures 1 and 4 and illustrates a third embodiment of the present invention.
Figure 8:
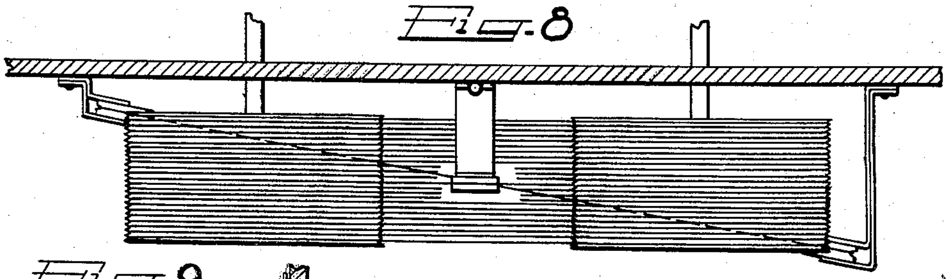
Figure 8 is a top plan view of the portion of the magnetic recorder which is shown in Figure 7.
Figure 9:
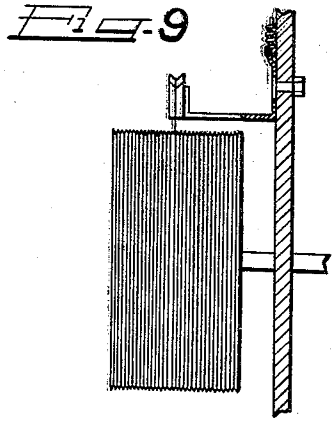
Figure 9 is an end view of the portion of the device illustrated in Figure 8 with the bracket and idler pulley assemblies removed.

The third embodiment of the present invention is illustrated in Figures 7, 8 and 9 of the drawings. This form is quite similar to the second form of the invention and includes the same type of drums 30 and 31 heretofore described. In this third form of the invention, however, the guide pulleys 35 and 36 are mounted in fixed brackets 37 and 38 secured to the panel 10. The tensioning of the wire is obtained by the manner in which the recorder head 16 is mounted. More particularly, the recorder head 16 is arranged to lift up one of the intermediate reaches of the wire as the wire 17 passes between the drum 30 and the drum 31. More specifically, the magnetic transducer head, which may be either a recorder head or reproducer head, or both, is mounted in a bracket 39 which is spring biased upwardly by suitable spring means 40.

In other respects the third embodiment of the present invention is similar to the second embodiment of the present invention.

While I have shown particular embodiments of my invention it will, of course, be understood that I do not wish to be limited thereto, since many modifications may be made, and I, therefore, contemplate by the appended claims, to cover all such modifications as fall within the true spirit and scope of my invention.

I claim as my invention:

1. A magnetic recorder comprising a pair of drums mounted for rotation, a continuous elongated record medium wound successively over first one drum and then another, said drums each having a series of annular grooves therein lying in spaced parallel planes, and a resiliently mounted magnetic transducer head positioned above the normal location of the reaches between said drums, one of the reaches of wire between said drum being lifted above the position of the other adjacent reaches by said transducer head.

2. A magnetic recorder comprising a pair of drums mounted for rotation, a continuous elongated record medium wound successively over first one drum and then another, said drums each having a series of annular grooves therein lying in spaced parallel planes, and a magnetic transducer head positioned above the normal location of the reaches between said drum, one of the reaches of wire between said drum being lifted above the position of the other adjacent reaches by said transducer head, and means for spring biasing said transducer head so that it lifts the portion of the record medium passing thereover away from the position of the other reaches, thereby to tension the record medium over said drum.

JAY STERLING KEMP.

REFERENCES CITED

The following references are of record in the file of this patent:

UNITED STATES PATENTS

| Number | Name | Date |
|---|---|---|
| 1,166,925 | Ober | Jan. 4, 1916 |
| 2,091,692 | Scott | Aug. 31, 1937 |
| 2,151,629 | Wallis | Mar. 21, 1939 |
| 2,209,157 | Glunt | July 23, 1940 |
| 2,224,854 | Begun | Dec. 17, 1940 |
| 2,235,126 | Towne | Mar. 18, 1941 |
| 2,327,956 | Begun | Aug. 24, 1943 |
| 2,372,810 | Camras | Apr. 3, 1945 |
| 2,421,750 | Gannett | June 10, 1947 |

FOREIGN PATENTS

| Number | Country | Date |
|---|---|---|
| 482,655 | Germany | Sept. 18, 1929 |